(12) United States Patent
McNulty et al.

(10) Patent No.: US 9,416,748 B2
(45) Date of Patent: Aug. 16, 2016

(54) METHOD OF COMPENSATING FOR INJECTOR AGING

(75) Inventors: Michael James McNulty, Lombard, IL (US); James E. Korenchan, Burr Ridge, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 506 days.

(21) Appl. No.: 14/114,563

(22) PCT Filed: Apr. 29, 2011

(86) PCT No.: PCT/US2011/034525
§ 371 (c)(1),
(2), (4) Date: Oct. 29, 2013

(87) PCT Pub. No.: WO2012/148418
PCT Pub. Date: Nov. 1, 2012

(65) Prior Publication Data
US 2014/0060495 A1    Mar. 6, 2014

(51) Int. Cl.
*F02M 51/00* (2006.01)
*F02D 41/34* (2006.01)
*F02M 19/02* (2006.01)
(Continued)

(52) U.S. Cl.
CPC ............... *F02D 41/34* (2013.01); *F02D 41/40* (2013.01); *F02M 19/0246* (2013.01); *F02M 21/0293* (2013.01); *F02M 65/007* (2013.01); *F02M 65/008* (2013.01); *F02M 65/00* (2013.01);
(Continued)

(58) Field of Classification Search
CPC . F02M 65/007; F02M 65/08; F02M 19/0246; F02M 21/0293; F02M 2200/06; F02M 51/00; F02M 57/02; F02M 61/00; F02M 61/16; F02M 61/18; F02M 63/00; F02M 63/02; F02M 65/00; F02M 65/001; F02B 77/04; F02D 41/04; F02D 41/30; F02D 41/34; F02D 41/38; F02D 41/40; Y02T 10/44
USPC .......... 701/101, 103, 104, 106, 112; 123/445, 123/446, 457, 467, 475, 478, 480, 198 A, 123/486–494, 406.47, 198 D; 73/114.38, 73/114.42, 114.45, 114.48, 114.49; 137/15.04, 15.05, 15.06; 295/5
See application file for complete search history.

(56) References Cited

U.S. PATENT DOCUMENTS 7,080,624 B2 * 7/2006 Britsch ................. F02D 41/402
123/295
7,877,189 B2 * 1/2011 Leone ..................... F02B 47/02
123/1 A (Continued)

*Primary Examiner* — Thomas Moulis
*Assistant Examiner* — John Bailey
(74) *Attorney, Agent, or Firm* — Jack D. Nimz; Jeffrey P. Calfa

(57) ABSTRACT

A method of controlling a fuel injector is provided. Engine speed is monitored. Engine torque output is monitored. It is determined if the engine speed is within one of a plurality of predefined engine speed ranges. It is determined if the engine torque output is within one of a plurality of predefined engine torque output ranges. One of a plurality of injector coking factors is assigned based on the determined predefined engine speed range and the determined predefined engine torque output range. A total injector coking factor is calculated based upon total operating time within each of the plurality of injector coking factors. A duration of a fuel injection is increased based upon the calculated total injector coking factor.

20 Claims, 3 Drawing Sheets

(51) Int. Cl.
  *F02M 21/02* (2006.01)
  *F02M 65/00* (2006.01)
  *F02D 41/40* (2006.01)

(52) U.S. Cl.
  CPC .......... *F02M65/001* (2013.01); *F02M 2200/06* (2013.01); *Y02T 10/44* (2013.01)

(56) References Cited

U.S. PATENT DOCUMENTS

| | | | |
|---|---|---|---|
| 7,894,976 B2* | 2/2011 | Yun | F02B 1/12 123/435 |
| 7,938,101 B2* | 5/2011 | Cinpinski | F02D 41/2467 123/446 |
| 2003/0065437 A1* | 4/2003 | Wuerfel | F02D 41/34 701/103 |
| 2004/0260449 A1* | 12/2004 | Heinstein | F02B 77/04 701/101 |
| 2007/0119413 A1* | 5/2007 | Lewis | F02D 41/0025 123/295 |
| 2007/0119421 A1* | 5/2007 | Lewis | F01N 11/002 123/431 |
| 2007/0119425 A1* | 5/2007 | Lewis | F02B 63/02 123/478 |
| 2008/0147298 A1* | 6/2008 | Suda | F02D 37/02 701/103 |
| 2008/0156303 A1* | 7/2008 | Bromberg | F02D 19/12 123/575 |
| 2008/0210207 A1* | 9/2008 | Boyarski | F02M 25/0228 123/575 |
| 2009/0007888 A1* | 1/2009 | Sarlashkar | F02D 35/026 123/478 |
| 2009/0211553 A1* | 8/2009 | Mattes | F02D 41/2451 123/299 |
| 2010/0059021 A1* | 3/2010 | Rau | F02D 41/2096 123/478 |
| 2010/0094527 A1* | 4/2010 | Futonagane | F02D 35/025 701/103 |
| 2010/0199951 A1* | 8/2010 | Cinpinski | F02D 41/2467 123/456 |
| 2010/0206269 A1* | 8/2010 | Cinpinski | F02D 41/3854 123/456 |
| 2011/0023851 A1 | 2/2011 | Johnson | |
| 2011/0030635 A1 | 2/2011 | Siuchta | |
| 2011/0185798 A1* | 8/2011 | Kim | G01M 15/04 73/114.48 |
| 2012/0318053 A1* | 12/2012 | Ikemoto | F02D 41/221 73/114.45 |
| 2013/0233282 A1* | 9/2013 | Reinstaedtler | F02D 41/3872 123/478 |

* cited by examiner

METHOD OF COMPENSATING FOR INJECTOR AGING

TECHNICAL FIELD

The present disclosure relates to a method of controlling a fuel injector. More particularly, the disclosure relates to a method of controlling a fuel injector that determines coking of a fuel injector and adjusts a fuel injection based on an estimated coking amount.

BACKGROUND

Fuel systems for modern diesel engines operate at ever increasing fuel injection pressures. One way to achieve these high fuel injection pressures is to utilize a hydraulically intensified fuel injection system. Such a system may utilize a high-pressure common rail system that provides fuel to each individual injector from a high-pressure accumulator, oftentimes referred to as the "rail" or "common rail." The injector also receives a high-pressure hydraulic fluid, such as fuel, engine oil, or other fluid, that is utilized to drive a piston, or other pressure intensifying system, to increase the pressure of the fuel that leaves the injector to the pressures required by modern diesel engines. As fuel injectors operate, the nozzle openings may be reduced from combustion effects in a process often referred to as "coking." As the nozzle opening of the fuel injector is reduced, a volume of fuel provided to a cylinder during a fuel injection event may be less than the expected injection volume, because less fuel is capable of passing through the reduced diameter nozzle opening. Therefore, as precise control of fuel injection becomes more important with more stringent emission standards, a need exists for a way to control fuel injection that corrects for coking of fuel injectors.

SUMMARY

According to one process, a method of controlling a fuel injector is provided. Engine speed is monitored. Engine torque output is monitored. It is determined if the engine speed is within one of a plurality of predefined engine speed ranges. It is determined if the engine torque output is within one of a plurality of predefined engine torque output ranges. One of a plurality of injector coking factors is assigned based on the determined predefined engine speed range and the determined predefined engine torque output range. A total injector coking factor is calculated based upon total operating time within each of the plurality of injector coking factors. A duration of a fuel injection is increased based upon the calculated total injector coking factor.

According to another process, a method of controlling a fuel injector is provided. At least one of engine torque output and engine speed is monitored. It is determined if at least one of the monitored engine torque output and engine speed is within one of a first predefined range, a second predefined range, and a third predefined range. An amount of time within one of the first predefined range, the second predefined range, and the third predefined range is monitored. A first injector coking factor is assigned if the amount of time within the first predefined range exceeds a first preset time limit. A second injector coking factor is assigned if the amount of time within the second predefined range exceeds a second preset time limit. A third injector coking factor is assigned if the amount of time within the third predefined range exceeds a third preset time limit. A total injector coking factor is calculated based upon total operating time within each of the first injector coking factor, the second injector coking factor, and the third injector coking factor. A duration of a fuel injection is increased based upon the calculated total injector coking factor.

According to a further process, a method of controlling a fuel injector is provided. Engine torque output is monitored. Engine speed is monitored. One of a plurality of coking factors is assigned based upon the monitored engine torque output and the monitored engine speed. An engine operating time at each assigned one of the plurality of coking factors is determined A total injector coking factor is calculated. The calculated total injector coking factor is compared to a predetermined maximum coking factor. A duration of a fuel injection is increased based upon one of the calculated total injector coking factor and the predetermined maximum coking factor.

DETAILED DESCRIPTION

Figure 1:
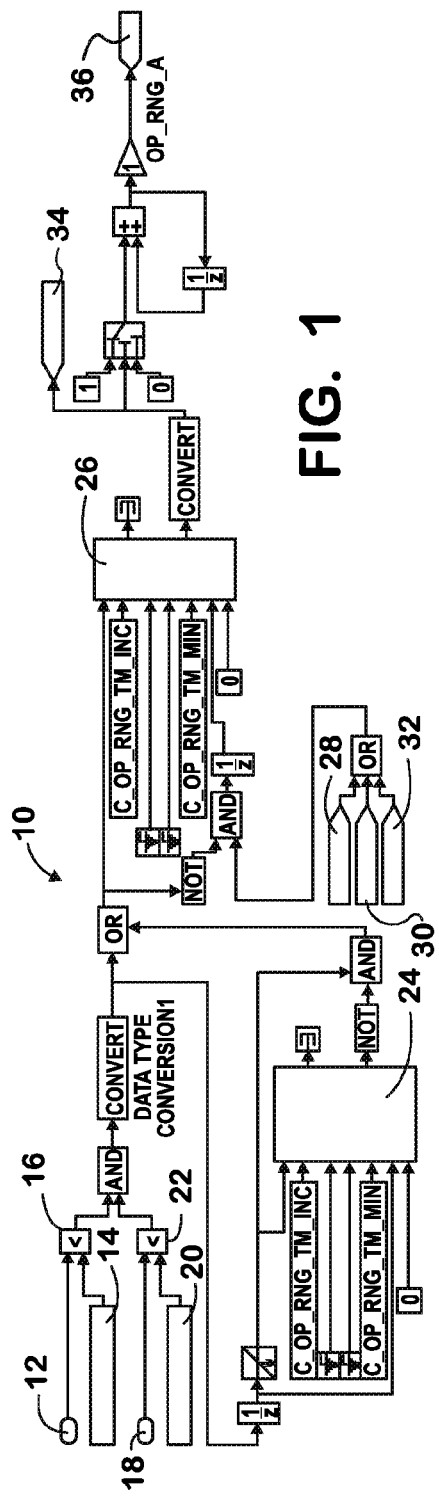
FIG. 1 is a schematic view of a control system for determining an injector coking factor for a first engine operating range for an internal combustion engine with coking correction.

FIG. 1 shows a schematic control diagram 10 for determining an injector coking factor for a first engine operating range. An engine speed indication 12 is compared to a first stored engine speed value 14 by a first comparator 16. The first comparator 16 determines if the engine speed indication 12 is less than the first stored engine speed value 14. Similarly, an engine torque output 18 is compared to a first stored engine torque output 20 by a second comparator 22. The second comparator 22 determines if the engine torque output 18 is less than the first stored engine torque output 20. The operation of the engine below the first stored engine speed value 14 and the first stored engine torque output 20 indicates that the engine is operating in a first operating output range A, as indicated by block 34.

A first timer loop 24 and a second timer loop 26 are also provided in the control diagram 10. The first timer loop 24 is utilized to track an amount of time that has passed since the last time the engine was operating in output range A 34. If the amount of time indicated by the first timer loop 24 exceeds a preset value, the first timer loop 24 is reset. Resetting the first timer loop 24 allows a more stable injector coking factor to be calculated, as certain transient operations in other output ranges may be ignored.

The second timer loop 26 is used to determine a total amount of operating time of the engine in output range A 34. The second timer loop 26 evaluates whether the engine was previously operating in output range B 28, output range C 30, or output range D 32. If the engine had been operating in one of the other output ranges, 28, 30, 32, the second timer loop 26 does not begin to count until the first timer loop 24 has reset, indicating that the engine has operated within output range A 34 for a sufficient period.

It has been found that engine operations within output range A 34 causes a negligible amount of injector coking. Therefore, operating range A 34 does not require a calculation of a coking correction amount; instead, an operating range A output 36 is calculated that simply indicates that the engine had been within operating range A for a period of time.

Figure 2:
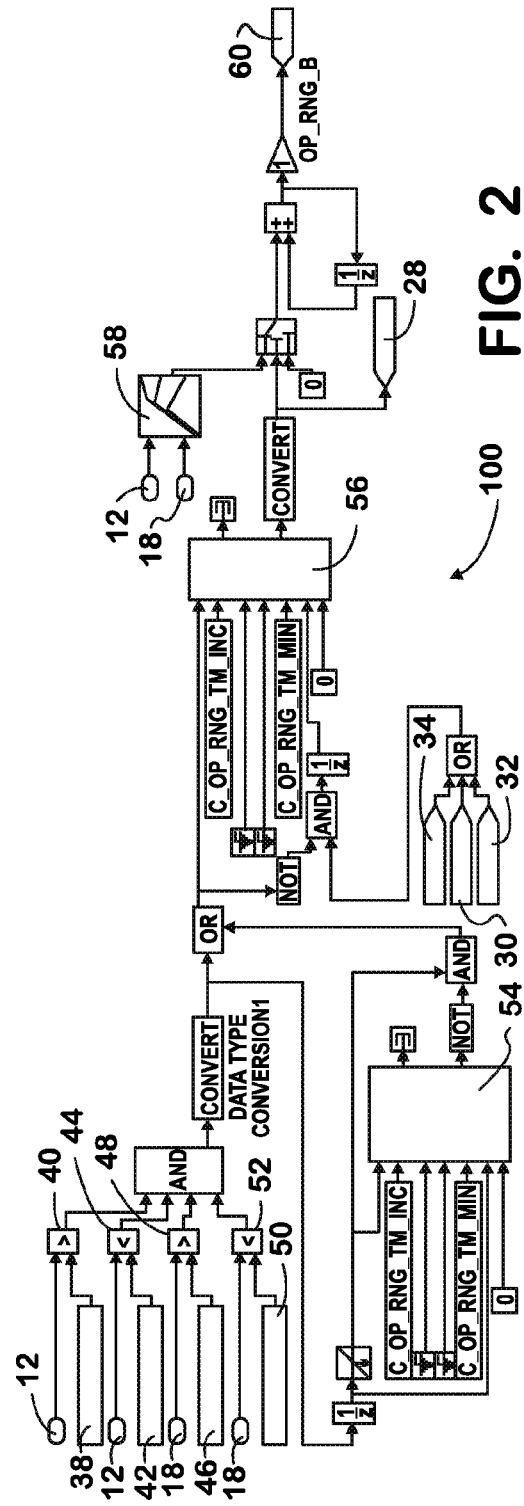
FIG. 2 is a schematic view of a control system for determining an injector coking factor for a second engine operating range for an internal combustion engine with coking correction.

FIG. 2 shows a schematic control diagram 100 for determining an injector coking factor for a second engine operating range. The engine speed indication 12 is compared to a second stored engine speed value 38 by a third comparator 40. The third comparator 40 determines if the engine speed indication 12 is greater than the second stored engine speed value 38. The engine speed indication 12 is also compared to a third stored engine speed value 42 by a fourth comparator 44. The fourth comparator 44 determines if the engine speed indication 12 is less than the third stored engine speed value 42.

Similarly, the engine torque output 18 is compared to a second stored engine torque output 46 by a fifth comparator 48. The fifth comparator 48 determines if the engine torque output 18 is greater than the second stored engine torque output 46. The engine torque output 18 is also compared to a third stored engine torque output 50 by a sixth comparator 52. The sixth comparator 52 determines if the engine torque output 18 is less than the third stored engine torque output 50. The operation of the engine between the second and third stored engine speeds 38, 42 and between the second and third stored engine torque outputs 46, 50 indicate that the engine is operating in a second operating output range B, as indicated by block 28.

A third timer loop 54 and a fourth timer loop 56 are also provided in the control diagram 100. The third timer loop 54 is utilized to track an amount of time that has passed since the last time the engine was operating in output range B 28. If the amount of time indicated by the third timer loop 54 exceeds a preset value, the third timer loop 54 is reset. Resetting the third timer loop 54 allows a more stable injector coking factor to be calculated, as certain limited duration transient operations in other output ranges may be ignored.

The fourth timer loop 56 is used to determine a total amount of operating time of the engine in output range B 28. The fourth timer loop 56 evaluates whether the engine was previously operating in output range A 34, output range C 30, or output range D 32. If the engine had been operating in one of the other output ranges 30, 32, 34, the fourth timer loop 56 does not begin to count until the third timer loop 54 has reset, indicating that the engine has operated within output range B 28 for a sufficient period.

Once the engine has been determined to be operating within output range B 28, a coking factor 58 is determined based on the engine speed 12 and the engine torque output 18. The coking factor 58 is based on stored information that estimates a rate of injector coking that takes place while the engine operates within output range B 28. The coking factor 58 may be based on empirical data gathered during engine testing, or may be in the form of an engine model. The coking factor 58 is multiplied by the time that the fourth timer loop 56 indicates the engine is operating within output range B 28 to provide a coking amount 60 for the operation with output range B 28.

Figure 3:
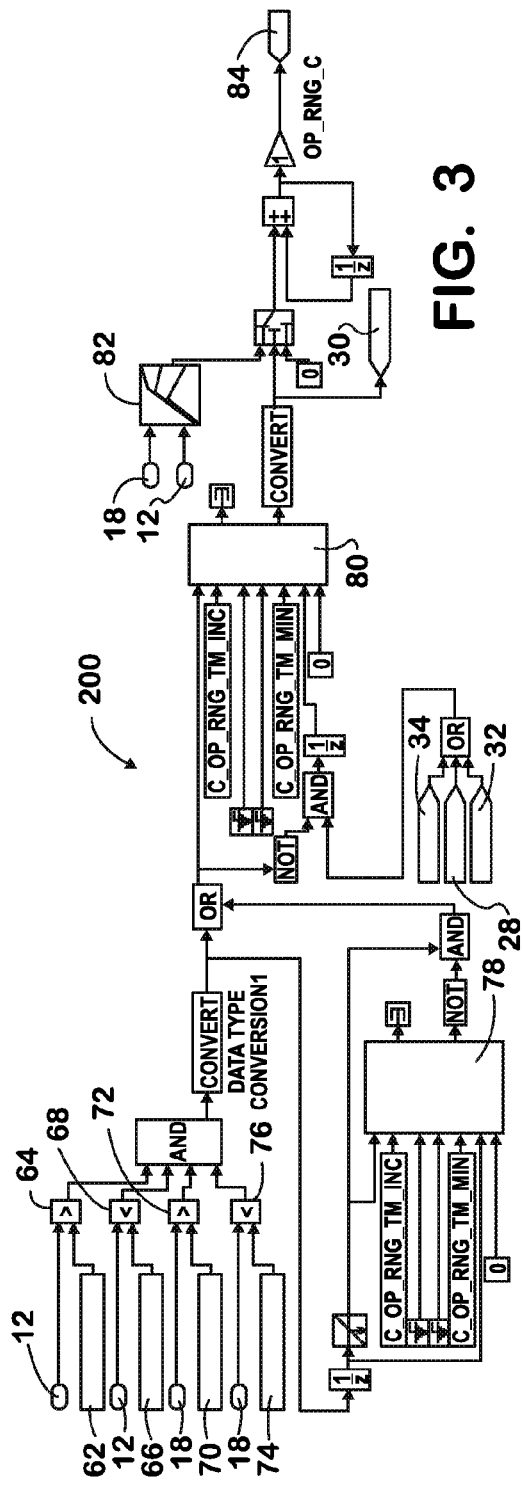
FIG. 3 is a schematic view of a control system for determining an injector coking factor for a third engine operating range for an internal combustion engine with coking correction.

FIG. 3 shows a schematic control diagram 200 for determining an injector coking factor for a third engine operating range. The engine speed indication 12 is compared to a fourth stored engine speed value 62 by a seventh comparator 64. The seventh comparator 64 determines if the engine speed indication 12 is more than the fourth stored engine speed value 62. The engine speed indication 12 is also compared to a fifth stored engine speed value 66 by an eighth comparator 68. The eighth comparator 68 determines if the engine speed indication 12 is less than the fifth stored engine speed value 66.

Similarly, the engine torque output 18 is compared to a fourth stored engine torque output 70 by a ninth comparator 72. The ninth comparator 72 determines if the engine torque output 18 is greater than the fourth stored engine torque output 70. The engine torque output 18 is also compared to a fifth stored engine torque output 74 by a tenth comparator 76. The tenth comparator 76 determines if the engine torque output 18 is less than the fifth stored engine torque output 74. The operation of the engine between the fourth and fifth stored engine speeds 62, 66 and between the fourth and fifth stored engine torque outputs 70, 74 indicate that the engine is operating in a third operating output range C, as indicated by block 30.

A fifth timer loop 78 and a sixth timer loop 80 are also provided in the control diagram 200. The fifth timer loop 78 is utilized to track an amount of time that has passed since the last time the engine was operating in output range C 30. If the amount of time indicated by the fifth timer loop 78 exceeds a preset value, the fifth timer loop 78 is reset. Resetting the fifth timer loop 78 allows a more stable injector coking factor to be calculated, as certain limited duration transient operations in other output ranges may be ignored.

The sixth timer loop 80 is used to determine a total amount of operating time of the engine in output range C 30. The sixth timer loop 80 evaluates whether the engine was previously operating in output range A 34, output range B 28, or output range D 32. If the engine had been operating in one of the other output ranges 28, 32, 34, the sixth timer loop 80 does not begin to count until the fifth timer loop 78 has reset, indicating that the engine has operated within output range C 30 for a sufficient period.

Once the engine has been determined to be operating within output range C 30, a coking factor 82 is determined based on the engine speed 12 and the engine torque output 18. The coking factor 82 is based on stored information that estimates a rate of injector coking that takes place while the engine operates within output range C 30. The coking factor 82 may be based on empirical data gathered during engine testing, or may be in the form of an engine model. The coking factor 82 is multiplied by the time that the sixth timer loop 80 indicates the engine is operating within output range C 30 to provide a coking amount 84 for the operation with output range C 30.

Figure 4:
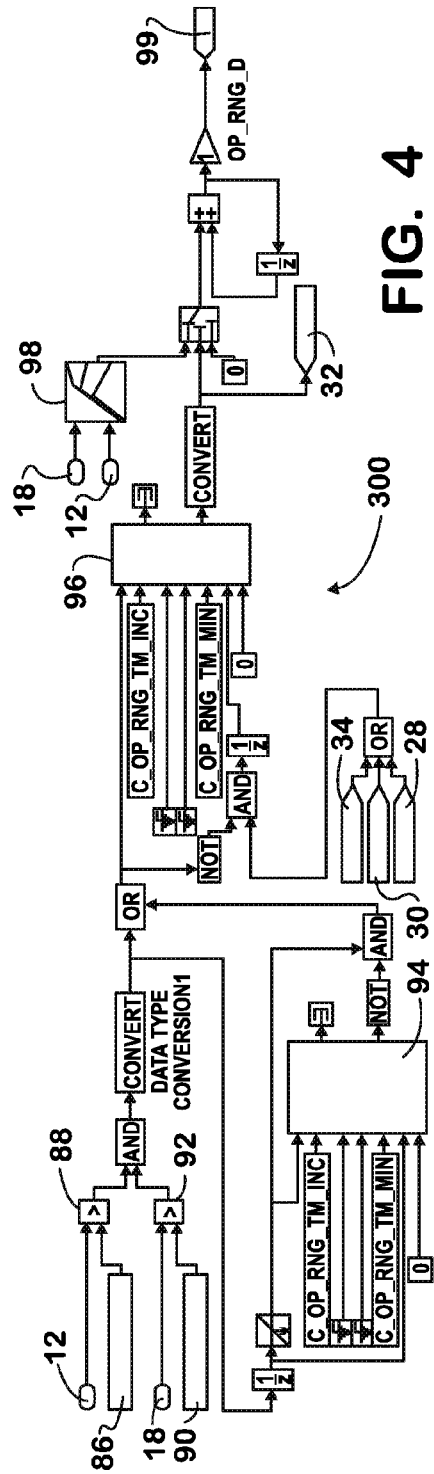
FIG. 4 is a schematic view of a control system for determining an injector coking factor for a fourth engine operating range for an internal combustion engine with coking correction.

FIG. 4 shows a schematic control diagram 300 for determining an injector coking factor for a fourth engine operating range. The engine speed indication 12 is compared to a sixth stored engine speed value 86 by an eleventh comparator 88. The eleventh comparator 88 determines if the engine speed indication 12 is more than the sixth stored engine speed value 86.

Similarly, the engine torque output 18 is compared to a sixth stored engine torque output 90 by a twelfth comparator 92. The twelfth comparator 92 determines if the engine torque output 18 is greater than the sixth stored engine torque output 90. The operation of the engine above the sixth stored engine speed 86 and the sixth stored engine torque output 90 indicates that the engine is operating in a fourth operating output range D, as indicated by block 32.

A seventh timer loop 94 and an eighth timer loop 96 are also provided in the control diagram 300. The seventh timer loop 94 is utilized to track an amount of time that has passed since the last time the engine was operating in output range D 32. If the amount of time indicated by the seventh timer loop 94 exceeds a preset value, the seventh timer loop 94 is reset. Resetting the seventh timer loop 94 allows a more stable injector coking factor to be calculated, as certain limited duration transient operations in other output ranges may be ignored.

The eighth timer loop 96 is used to determine a total amount of operating time of the engine in output range D 32. The eighth timer loop 96 evaluates whether the engine was previously operating in output range A 34, output range B 28, or output range C 30. If the engine had been operating in one of the other output ranges 28, 30, 34, the eighth timer loop 96 does not begin to count until the seventh timer loop 94 has reset, indicating that the engine has operated within output range D 32 for a sufficient period.

Once the engine has been determined to be operating within output range D 32, a coking factor 98 is determined based on the engine speed 12 and the engine torque output 18. The coking factor 98 is based on stored information that estimates a rate of injector coking that takes place while the engine operates within output range D 32. The coking factor 98 may be based on empirical data gathered during engine testing, or may be in the form of an engine model. The coking factor 98 is multiplied by the time that the eighth timer loop 96 indicates the engine is operating within output range D 32 to provide a coking amount 99 for the operation with output range D 32.

Thus, in summary, FIGS. 1-4 depict that four different operating ranges, output ranges A-D 28-34, are determined based on observed engine speed 12 and engine torque output 18. Once the operating range is determined, an amount of time the engine operates within that range is measured. The control logic allows for only one operating range to be active at any given time. Additionally, in order to prevent transient operations of the engine from having too great an effect on the determined operating range, the control logic requires that the determined operating range to remain active for a predefined period before the control logic switches from the preceding determined operating range. For example, if output range B 28 was active and the logic now determines that the engine is operating in output range C 30, a set amount of time within operating range C 30 must occur before the logic changes the coking amount 60 from the operating range B 28 to the coking amount 84 of the operating range C 30. Thus, according to one embodiment, only one of the four operating ranges is active at any given time, and the engine must operate within an operating range for a preset amount of time before that operating range is recognized as the active operating range.

Figure 5:
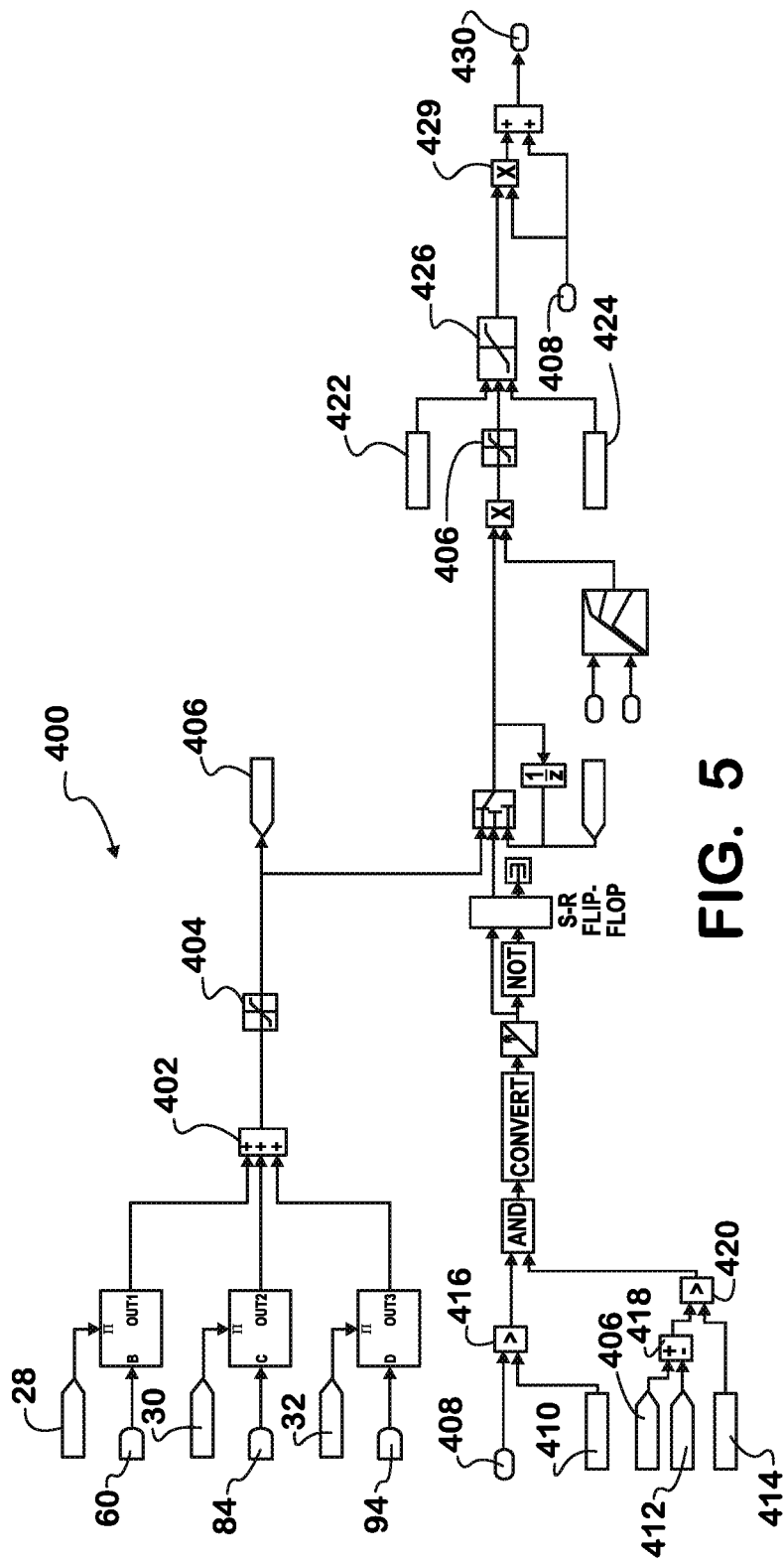
FIG. 5 is a schematic view of a control diagram for a fuel injector with coking correction.

Turning now to FIG. 5, a schematic control diagram for a fuel injector with coking correction 400 is shown. The coking amount 60 for the operation within output range B 28, the coking amount 84 for the operation within output range C 30, and the coking amount 99 for the operation within output range F 32 are added together to create a sum of the coking amounts 60, 84, 99, as shown at block 402. The sum of the coking amounts 60, 84, 99 are compared to a maximum coking amount limit and a minimum coking amount limit at block 404. If the sum of the coking amounts is more than the maximum coking amount limit, the sum of the coking amounts 60, 84, 99 is reduced to the maximum coking amount limit. The lesser of the sum of the coking amounts 60, 84, 99 and the maximum coking amount limit is then set as the coking factor sum 406 indicating the total amount of coking of the fuel injector.

The schematic control diagram 400 additionally compares a total running time of the engine 408 to a stored minimum engine running time for coking correction 410 with a comparator 416. If the total running time of the engine 408 is less than the stored minimum running time for coking correction 410, no coking correction occurs, as the injectors are not likely to have sufficient coking to warrant a change in fuel injection parameters.

The coking factor sum 406 is also compared to a preceding coking factor sum 412 by subtracting the preceding coking factor sum 412 from the coking factor sum 406 to determine a coking differential 418. The coking differential 418 is compared to a stored minimum coking differential 414 by comparator 420. If the coking differential 418 is less than the minimum coking differential 414, no additional coking correction occurs, as the amount of coking that has occurred since the last coking correction was made is insignificant.

If the total running time of the engine 408 and the coking differential 418 are sufficient, the coking factor sum 406 is provided to a fuel injector duration modifier 426. The fuel injector duration modifier 426 contains data based on the coking factor sum 406 to indicate a correction to the duration of a fuel injection event based on the coking factor sum 406 and the total running time of the engine 408. The fuel injector duration modifier 426 may contain data based upon empirical data generated during engine testing, or may be model based.

The fuel injector duration modifier 426 output is compared to a stored maximum injector duration 428 by a comparator 429. If the output of the fuel injector duration modifier 426 is more than the stored maximum injection duration, comparator 429 reduces the output of the fuel injector duration modifier 426 to the stored maximum injection duration 428. The output of the comparator 429 is then provided as the modified injector duration 430.

It is contemplated that the stored maximum injector duration 428 may be based on a variety of factors, such as a maximum amount of time fuel injection can occur to allow combustion timing to remain as desired, the maximum amount of time fuel injection can occur to meet an emissions threshold, or the maximum amount of time fuel injection can occur based upon the engine speed or the engine torque output.

Experimental data has shown that injector coking may reach a maximum coking amount of about 7% reduction in fluid flow through the nozzle openings of the injector. Thus, the maximum injection duration 428 may be based upon an injection duration required to increase the flow of the injection by about 7%, in order to compensate for the reduction in flow from coking.

What is claimed is:
1. A method of controlling a fuel injector comprising:
monitoring engine speed;
monitoring engine torque output;
determining if the engine speed is within one of a plurality of predefined engine speed ranges;
determining if the engine torque output is within one of a plurality of predefined engine torque output ranges;
assigning one of a plurality of injector coking factors based on the determined predefined engine speed range and the determined predefined engine torque output range;
calculating a total injector coking factor based upon total operating time within each of the plurality of injector coking factors; and
increasing a duration of a fuel injection based upon the calculated total injector coking factor.

2. The method of claim 1, wherein one of the plurality of injector coking factors indicates that no injector coking is occurring.

3. The method of claim 1, further comprising comparing the total injector coking factor to a predefined maximum injector coking limit.

4. The method of claim 3, wherein the total injector coking factor is set to the lower of the total injector coking factor and the predefined maximum injector coking limit.

5. The method of claim 4, further comprising generating an increased injector duration amount based upon the total injector coking factor.

6. The method of claim 5, further comprising comparing the increased injector duration amount to a stored maximum injector duration; and
setting the increased injector duration amount to the smaller of the increased injector duration amount and the maximum injector duration.

7. The method of claim 6, wherein the maximum injector duration is based upon an emissions threshold.

8. The method of claim 6, wherein the maximum injector duration is based upon combustion timing.

9. A method of controlling a fuel injector comprising:
monitoring at least one of engine torque output and engine speed;
determining if at least one of the monitored engine torque output and engine speed is within one of a first predefined range, a second predefined range, and a third predefined range;
monitoring an amount of time within one of the first predefined range, the second predefined range, and the third predefined range;
assigning a first injector coking factor if the amount of time within the first predefined range exceeds a first preset time limit;
assigning a second injector coking factor if the amount of time within the second predefined range exceeds a second preset time limit;
assigning a third injector coking factor if the amount of time within the third predefined range exceeds a third preset time limit;
calculating a total injector coking factor based upon total operating time within each of the first injector coking factor, the second injector coking factor, and the third injector coking factor; and
increasing a duration of a fuel injection based upon the calculated total injector coking factor.

10. The method of claim 9, wherein the first injector coking factor indicates that no injector coking is occurring.

11. The method of claim 9, further comprising comparing the total injector coking factor to a predefined maximum injector coking limit.

12. The method of claim 11, wherein the total injector coking factor is set to the lower of the total injector coking factor and the predefined maximum injector coking limit.

13. The method of claim 9, further comprising:
comparing a total engine operating time to a stored minimum engine operating time; and
setting the total injector coking factor to zero if the total engine operating time is less than the stored minimum engine operating time.

14. The method of claim 9, further comprising generating an increased injector duration amount based upon the total injector coking factor.

15. The method of claim 14, further comprising comparing the increased injector duration amount to a stored maximum injector duration; and
setting the increased injector duration amount to the smaller of the increased injector duration amount and the maximum injector duration.

16. The method of claim 9, further comprising:
comparing the total injector coking factor to a previously calculated total injector coking factor; and
utilizing the previously calculated total injector coking factor if the difference between the total injector coking factor and the previously calculated coking injector coking factor does not exceed a stored threshold.

17. The method of claim 15, wherein the maximum injector duration is based upon combustion timing.

18. A method of controlling a fuel injector comprising:
monitoring engine torque output;
monitoring engine speed;
assigning one of a plurality of coking factors based upon the monitored engine torque output and the monitored engine speed;
determining an engine operating time at each assigned one of the plurality of coking factors;
calculating a total injector coking factor;
comparing the calculated total injector coking factor to a predetermined maximum coking factor; and
increasing a duration of a fuel injection based upon one of the calculated total injector coking factor and the predetermined maximum coking factor.

19. The method of claim 18, wherein the duration of the fuel injection is based upon the lesser of the calculated total injector coking factor and the predetermined maximum coking factor.

20. The method of claim 18 further comprising:
comparing a total engine operating time to a stored minimum engine operating time; and
setting the total injector coking factor to zero if the total engine operating time is less than the stored minimum engine operating time.

* * * * *